(12) United States Patent
Padmanabhan et al.

(10) Patent No.: US 6,907,541 B1
(45) Date of Patent: Jun. 14, 2005

(54) SYSTEM FOR RECOVERING RECEIVED DATA WITH A RELIABLE GAPPED CLOCK SIGNAL AFTER READING THE DATA FROM MEMORY USING ENABLE AND LOCAL CLOCK SIGNALS

(75) Inventors: Ramesh Padmanabhan, Los Altos, CA (US); Pradeep Sindhu, Los Altos Hills, CA (US); Eric M. Verwillow, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 680 days.

(21) Appl. No.: 09/706,752

(22) Filed: Nov. 7, 2000

(51) Int. Cl.$^7$ ................................................ G06F 1/04
(52) U.S. Cl. ...................... 713/503; 370/503; 375/372; 710/57
(58) Field of Search .................. 713/503; 375/372; 370/300, 503; 710/57

(56) References Cited

U.S. PATENT DOCUMENTS

| | | | | |
|---|---|---|---|---|
| 4,397,017 A | * | 8/1983 | Rokugo | 370/506 |
| 4,596,026 A | * | 6/1986 | Cease et al. | 375/372 |
| 4,692,894 A | * | 9/1987 | Bemis | 710/57 |
| 5,111,485 A | * | 5/1992 | Serack | 375/363 |
| 5,384,770 A | * | 1/1995 | Mays et al. | 370/300 |
| 5,461,380 A | * | 10/1995 | Peters et al. | 341/100 |
| 5,563,891 A | * | 10/1996 | Wang | 370/505 |
| 5,602,882 A | * | 2/1997 | Co et al. | 375/372 |
| 6,069,876 A | * | 5/2000 | Lander et al. | 370/249 |
| 6,594,329 B1 | * | 7/2003 | Susnow | 375/372 |

* cited by examiner

*Primary Examiner*—Thomas Lee
*Assistant Examiner*—Albert Wang
(74) *Attorney, Agent, or Firm*—Harrity & Snyder, LLP

(57) ABSTRACT

A system for reliably receiving data includes a memory, write logic, and read logic. The write logic receives data and an unreliable clock signal and writes the data to the memory using the unreliable clock signal. The read logic generates a gapped clock signal and reads the data from the memory using the gapped clock signal. The read logic generates the gapped clock signal by turning on and off a constant local clock signal.

44 Claims, 10 Drawing Sheets

420 →

SYSTEM FOR RECOVERING RECEIVED DATA WITH A RELIABLE GAPPED CLOCK SIGNAL AFTER READING THE DATA FROM MEMORY USING ENABLE AND LOCAL CLOCK SIGNALS

BACKGROUND OF THE INVENTION

A. Field of the Invention

The present invention relates generally to communication systems and, more particularly, to systems and methods for generating a reliable clock to aid in the reception and recovery of data signals.

B. Description of Related Art

Some communication systems, such as synchronous optical networks (SONETs), transmit clock signals along with data signals. A system that receives the data signals may use the clock signals to recover the data signals. Sometimes, however, the received clock signals degrade or are lost during transmission. In this case, the receiving system cannot properly recover the accompanying data signals.

Therefore, there exists a need for a mechanism that facilitates the reception and recovery of data signals when unreliable clock signals accompany the data.

SUMMARY OF THE INVENTION

Systems and methods consistent with the present invention address this need by providing a reliable clock generator that converts from an unreliable clock domain to a fixed clock domain to facilitate the reception and recovery of data signals.

In accordance with the purpose of the invention as embodied and broadly described herein, a system for reliably receiving data includes a memory, write logic, and read logic. The write logic receives data and an unreliable clock signal and writes the data to the memory using the unreliable clock signal. The read logic generates a gapped clock signal and reads the data from the memory using the gapped clock signal. The read logic generates the gapped clock signal by turning on and off a constant local clock signal.

In another implementation consistent with the present invention, a receiver includes a receiver component and a reliable clock generator. The reliable clock generator receives data and an unreliable clock signal and writes the data to a memory using the unreliable clock signal. The reliable clock generator also generates a reliable clock signal to compensate for underflow conditions in the memory, reads the data from the memory using the reliable clock signal, and provides the data and the reliable clock signal to the receiver component.

In a further implementation consistent with the present invention, a clock generator includes first and second state machines. The first state machine generates first and second enable signals. The first enable signal is used to read data from a memory that was written to the memory using an unreliable clock signal. The second state machine generates a gapped clock signal for reliably recovering the data in response to the second enable signal.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a reliable clock generating mechanism that facilitates the reception of data when a potentially variable clock is received. The reliable clock generating mechanism converts from the potentially variable clock domain to a fixed local clock domain so that no data is lost under normal operating conditions. Under abnormal clocking situations, such as those cases when the potentially variable clock is degraded or missing, the reliable clock generating mechanism provides a fixed clock to receiving logic to facilitate the reception and recovery of the data. Upon restoration of the potentially variable clock, the reliable clock generating mechanism permits the received data to track the potentially variable clock.

Exemplary System

Figure 1:
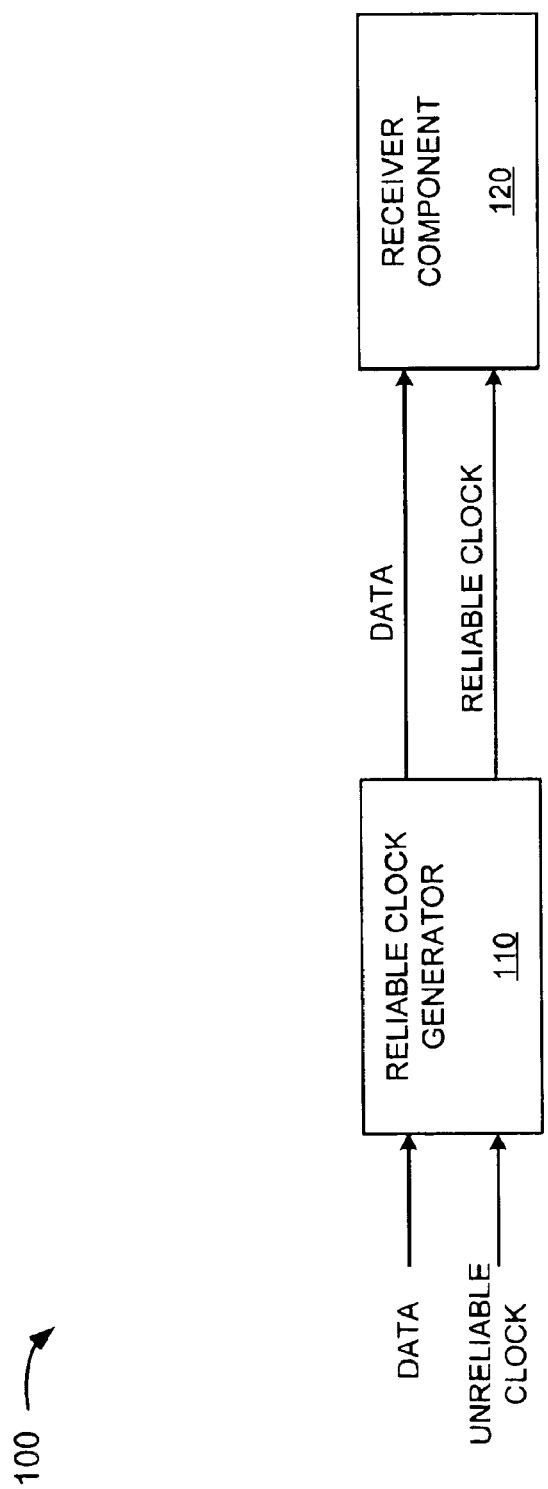
FIG. 1 is a diagram of an exemplary system in which systems and methods consistent with the present invention may be implemented.

FIG. 1 is an exemplary system 100 in which systems and methods consistent with the present invention may be implemented. The system 100 may be a receiver of a device, such as a network node, a switch, a computer device, etc., operating in a network, such as a SONET or a similar network. The system 100 may include a reliable clock generator 110 and a receiver component 120. The reliable clock generator 10 may receive data and an unreliable clock signal from a transmission medium, such as a network. The clock signal is considered unreliable because it may, in some instances, be degraded or missing. This may occur, for example, when failures exist in the network through which the clock signal is transmitted.

The reliable clock generator 10 generates a reliable clock signal to replace the unreliable clock signal and transmits the reliable clock signal, along with the data, to the receiver component 120. The receiver component 120 may include conventional receiver mechanisms to receive and recover the data using the reliable clock signal.

Exemplary Reliable Clock Generator

Figure 2:
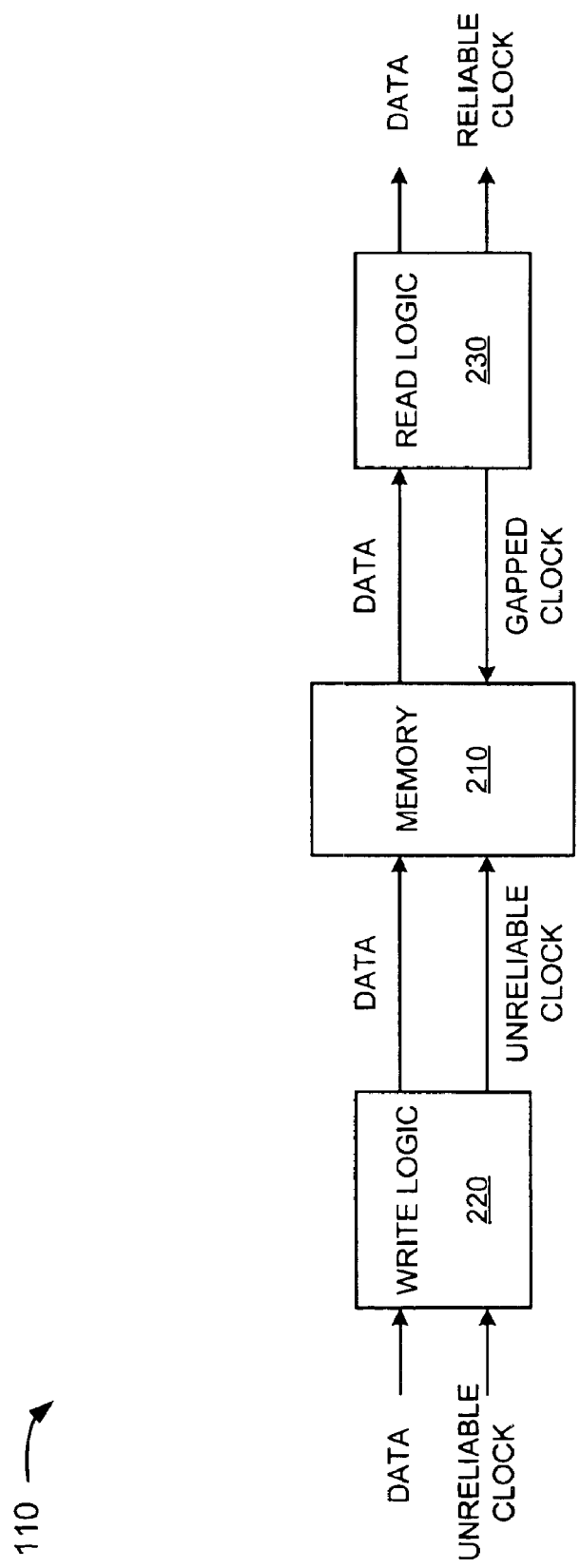
FIG. 2 is a diagram of the reliable clock generator of FIG. 1 according to an implementation consistent with the present invention.

FIG. 2 is an exemplary diagram of the reliable clock generator 110 according to an implementation consistent with the present invention. The reliable clock generator 110 may include a memory 210, write logic 220, and read logic 230. The memory 210 may include a first-in, first-out (FIFO) memory or a similar memory device. The write logic 220 receives data and an unreliable clock signal from a network, for example, and writes the data to the memory 210 using the unreliable clock signal. The read logic 230 generates a reliable clock signal and reads the data from the memory 210. The read logic 230 may then send the data from the memory 210 and the reliable clock signal to the receiver component 120 (FIG. 1).

Figure 3:
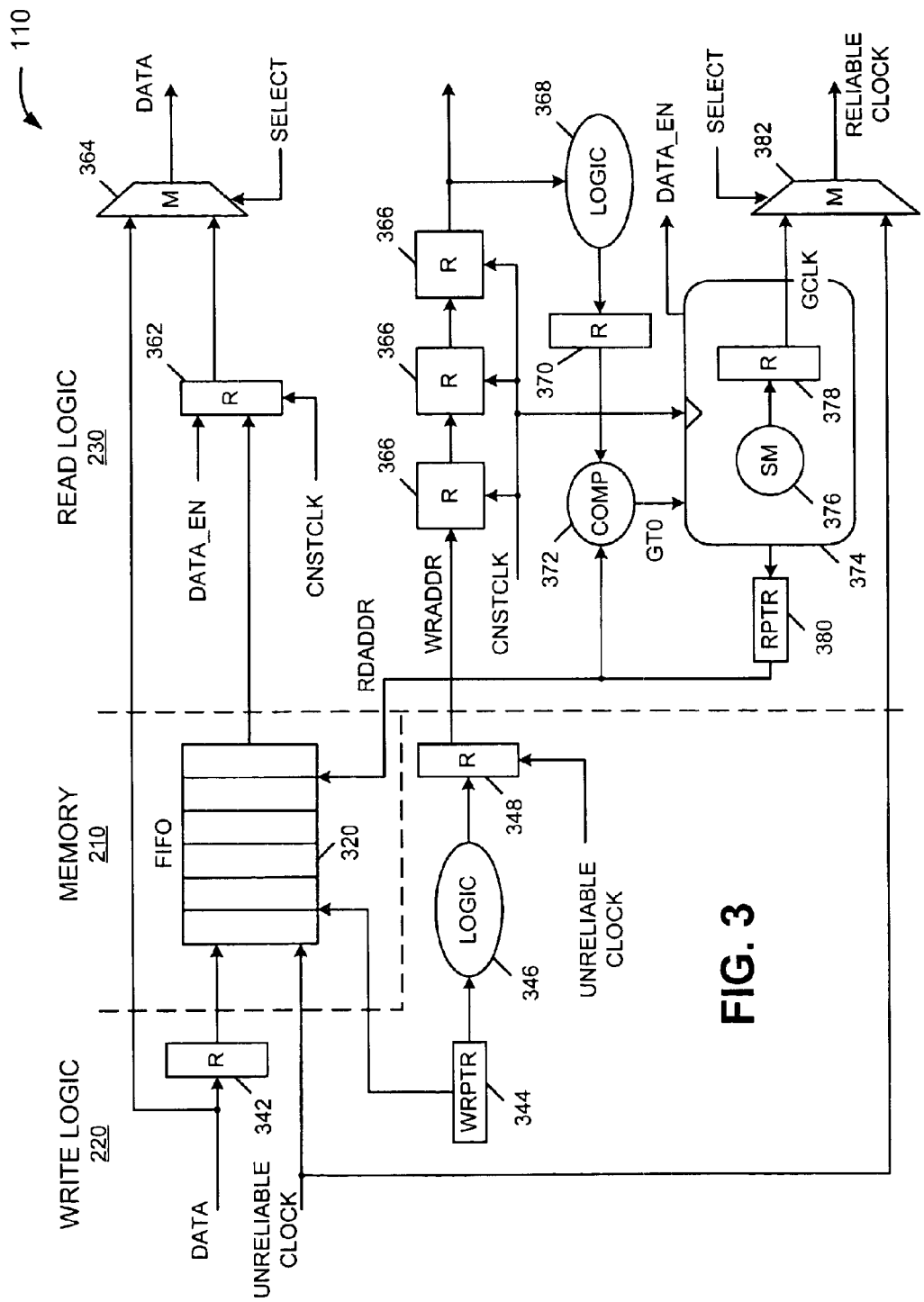
FIG. 3 is a detailed diagram of the reliable clock generator of FIG. 2 according to an implementation consistent with the present invention.

FIG. 3 is a detailed diagram of the components of reliable clock generator 10 according to an implementation consistent with the present invention. As illustrated in FIG. 2, the clock generator 110 may include a memory 210, write logic 220, and read logic 230. In the implementation shown in FIG. 3, the memory 210 includes a FIFO 320. The FIFO 320 may include one or more conventional memory devices arranged as a FIFO that separates the clock domain of the write logic 220 from the clock domain of the read logic 230.

The write logic 220 receives data and an unreliable clock signal from a transmission medium, such as a network. In an implementation consistent with the present invention, the data includes SONET data (128 bits wide) and the unreliable clock signal includes a 77 MHz clock signal. The write logic 220 may include register 342, write pointer 344, logic 346, and register 348.

The register 342 may include a conventional memory device that buffers data for transmission to the FIFO 320 based on the unreliable clock signal. The write pointer 344 may include a conventional mechanism for generating an address for accessing the FIFO 320 to write data. The logic 346 may include conventional combinational logic that converts the write address generated by the write pointer 344 to a form for use by the read logic 230. For example, the logic 346 may convert the write address to a gray code sequence. The register 348 may include a conventional memory device that buffers the gray code sequence (i.e., the write address) from the logic 346 using the unreliable clock signal.

The read logic 230 may use a constant clock signal to read the data from the memory 210 and generate a reliable clock signal for use by the receiver component 120. The read logic 230 may include register 362, multiplexer 364, registers 366, logic 368, register 370, comparator 372, gapped clock generator 374, read pointer 380, and multiplexer 382. The register 362 may include a conventional memory device that buffers data from the FIFO 320 in response to a data enable signal (DATA_EN) and a constant clock signal (CNSTCLK) of, for example, 157 MHz. The data enable signal (DATA_EN) assures that the register 362 reads data from the FIFO 320 only when data exists in the FIFO 320 and, thereby, prevents unstable data from being latched by the register 362.

The multiplexer 364 may include a conventional multiplexing device that receives the data received by the write logic 220 and the data buffered by the register 362 as inputs and outputs one of them as an output data signal. In an implementation consistent with the present invention, the multiplexer 364 normally selects the input from the register 362 except during a diagnostic mode.

The registers 366 may include conventional registers that act as a synchronizer to temporarily store and shift the gray code sequence (i.e., write address) from the write logic 220 in response to the constant clock signal (CNSTCLK). The logic 368 may include conventional combinational logic that converts the gray code sequence back into the write address. For example, the logic 368 may perform the opposite conversion as performed by the logic 346 to restore the write address. The register 370 may include a conventional memory device that buffers the write address from the logic 368.

The comparator 372 may include a conventional mechanism capable of comparing two values and generating a result. The comparator 372 may compare the write address from the register 370 to a read address from the read pointer 380 to determine whether the FIFO 320 contains data. The comparator 372 sends the result of its comparison (i.e., a signal GT0 that indicates that there are "greater than 0" entries in the FIFO 320) to the gapped clock generator 374. The read pointer 380 may include a conventional mechanism for generating an address for accessing the FIFO 320 to read data.

The gapped clock generator 374 may receive the constant clock signal (CNSTCLK) and generate the data enable signal (DATA_EN) used by the register 362 and a gapped clock (GCLK) of, for example, approximately 78.5 MHz. The gapped clock generator 374 may include state machine 376 and register 378. The state machine 376 may include a finite state machine that uses the 157 MHz constant clock signal (CNSTCLK) to create an output that toggles every 157 MHz clock cycle, thereby creating a 78.5 MHz clock signal (i.e., a divide-by-two version of the 157 MHz clock). The state machine 376 creates the gapped clock (GCLK) by turning on and off the 78.5 MHz clock. The gapped clock signal (GCLK) compensates for underflow conditions in the FIFO 320 and aids in recovery of the data.

The register 378 may include a conventional memory device that stores the gapped clock signal (GCLK) generated by the state machine 376. The multiplexer 382 may include a conventional multiplexing device that receives the unreliable clock signal received by the write logic 220 and the gapped clock signal (GCLK) generated by the gapped clock generator 374 and outputs one of them as a reliable clock signal. In an implementation consistent with the present invention, the multiplexer 382 normally selects the gapped clock signal except during a diagnostic mode.

Exemplary State Machine

Figure 4:
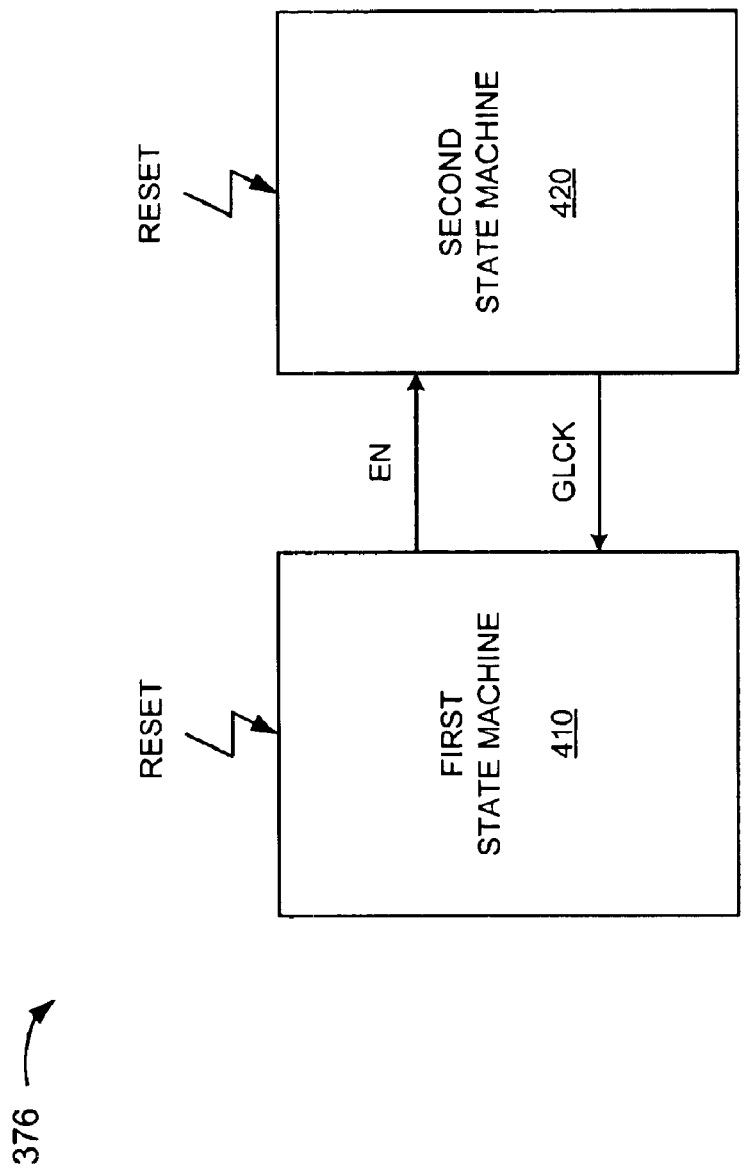
FIG. 4 is an exemplary diagram of the state machine of FIG. 3 according to an implementation consistent with the present invention.

FIG. 4 is an exemplary diagram of the state machine 376 in an implementation consistent with the present invention. The state machine 376 may include two separate state machines 410 and 420 that operate in response to a reset signal. The reset signal occurs when data is received by the FIFO 320. The first state machine 410 may generate an enable signal (EN) to control operation of the second state machine 420. The second state machine 420 may generate a clock signal (GCLK) in response to the enable signal (EN) from the first state machine 410. The clock signal (GCLK) may be the gapped clock signal generated by the state machine 376.

Figure 5:
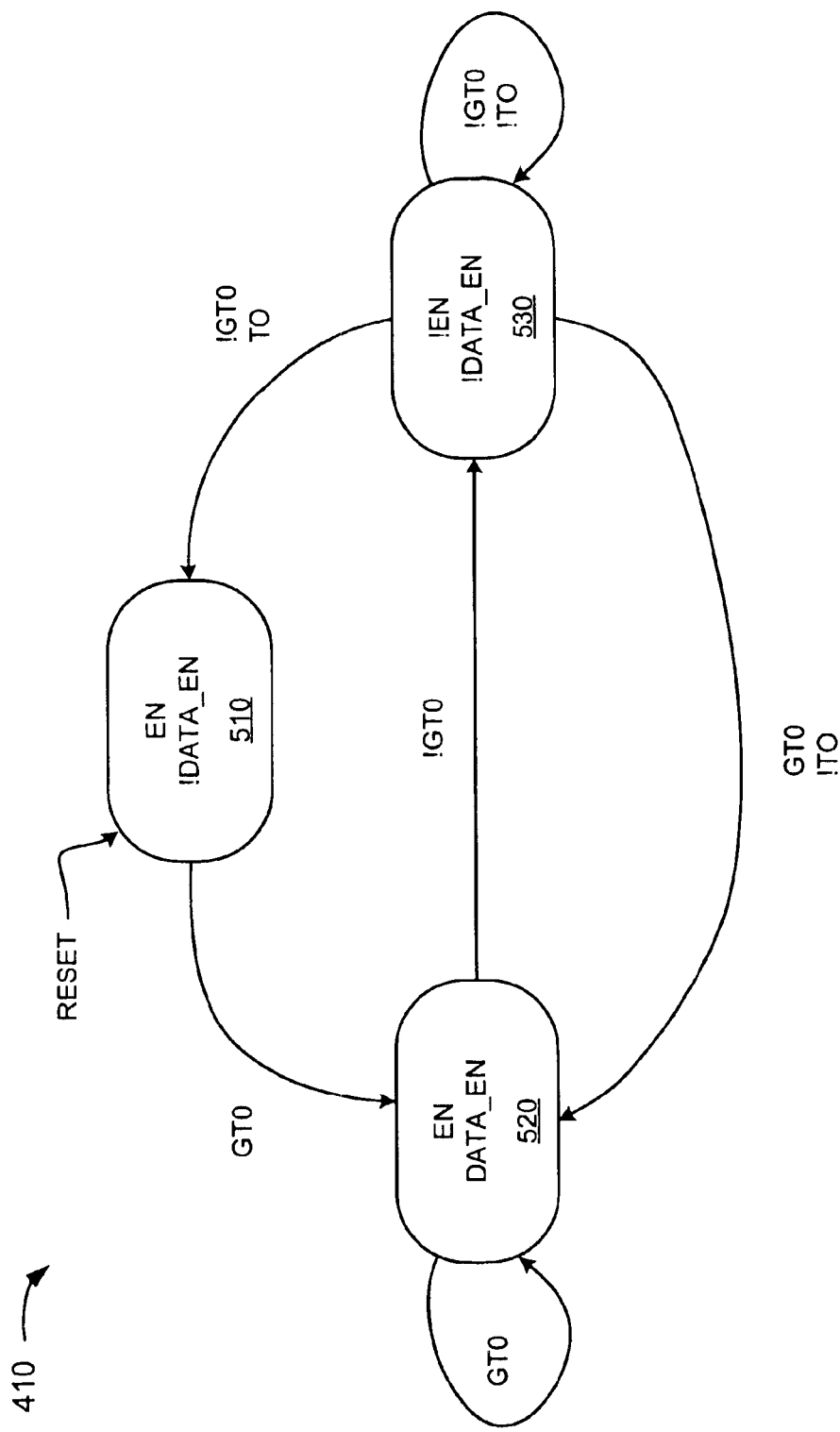
FIG. 5 is an exemplary diagram of the first state machine of FIG. 4 according to an implementation consistent with the present invention.

FIG. 5 is an exemplary diagram of the first state machine 410 according to an implementation consistent with the present invention. The first state machine 410 may operate in three states 510–530. In this implementation, the state machine 410 changes state upon the occurrence of certain events. One of these events may include the receipt of the clock signal (GCLK) from the second state machine 420.

The state machine 410 enters the first state 510 upon receipt of the reset signal. In the first state 510, the state machine 410 generates the enable signal (EN) used by the second state machine 420 and a complement value for the data enable signal (!DATA_EN) used by the register 362 (FIG. 3). Upon receipt of the GT0 signal from the comparator 372, indicating that there is data in the FIFO 320, the state machine 410 enters the second state 520. In the second state 520, the state machine 410 generates the enable signal (EN) and the data enable signal (DATA_EN). The state machine 410 remains in the second state 520 as long as the FIFO 320 contains data (i.e., as long as the comparator 372 generates the GT0 signal).

When no data remains in the FIFO 320, resulting in a complement value for the GT0 signal (!GT0), the state machine 410 enters the third state 530. In the third state 530, the state machine 410 may generate complement values for both the enable signal (!EN) and the data enable signal (!DATA_EN). Also, the state machine 410 may start a time-out counter upon entering the third state 530. The time-out counter times out (TO) when the FIFO 320 remains empty for a certain number of cycles. This may occur when the unreliable clock signal received by the write logic 220 (FIG. 1) degrades or disappears. The time-out period for the time-out counter should be long enough for all programmed inputs/outputs (PIOs) to complete successfully, such as 10 cycles.

As long as the FIFO 320 remains empty and the time-out counter has not timed out (!TO), the state machine 410 remains in the third state 530. If the time-out counter times out (TO), the state machine 410 returns to the first state 510, where it generates the enable signal (EN) and a complement value for the data enable signal (!DATA_EN). This transition may occur when the unreliable clock signal has not been received for longer than the timeout period.

If, on the other hand, the FIFO 320 receives data before the time-out counter times out (!TO), the state machine 410 returns to the second state 520, where it generates both the enable signal (EN) and the data enable signal (DATA_EN). This transition may occur when the write logic 220 begins to receive the unreliable clock signal again.

Figure 6:
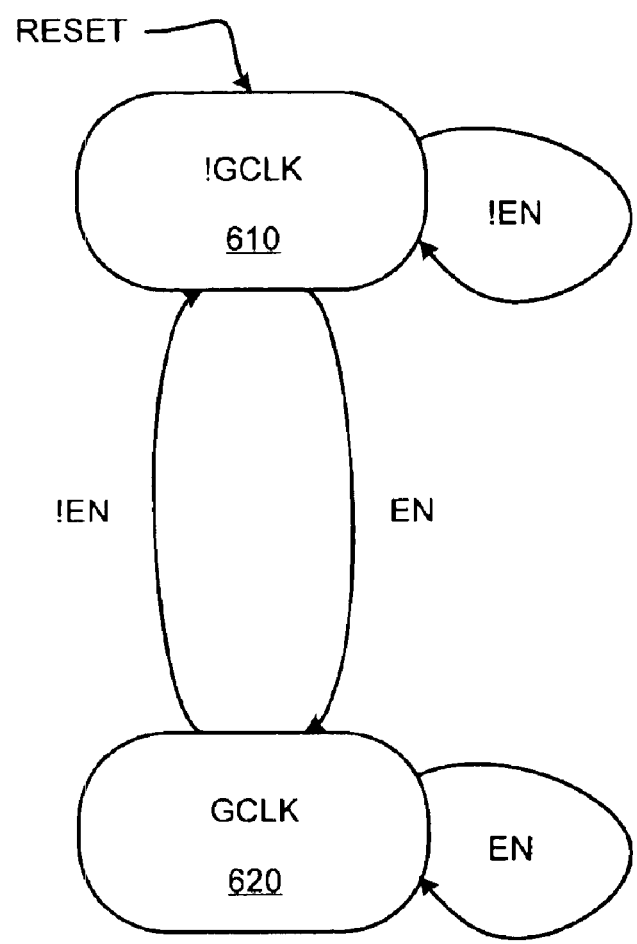
FIG. 6 is an exemplary diagram of the second state machine of FIG. 4 according to an implementation consistent with the present invention.

FIG. 6 is an exemplary diagram of the second state machine 420 according to an implementation consistent with the present invention. The second state machine 420 may operate in two states 610 and 620. In this implementation, the state machine 420 changes state based on the value of the enable signal (EN) from the first state machine 410.

The state machine 420 enters the first state 610 upon receipt of the reset signal. In the first state 610, the state machine 420 remains idle. When the state machine 420 receives the enable signal (EN) from the first state machine 410, the state machine 420 enters the second state 620. Otherwise, the state machine 420 remains in the first state 610.

In the second state 620, the state machine 420 generates a constantly oscillating clock signal (GCLK) using, for example, the constant clock signal (CNSTCLK). The state machine 420 remains in the second state 620 until it receives a complement value for the enable signal by (!EN) from the first state machine 410. When this occurs, the state machine 420 returns to the first state 610 and becomes idle, thereby discontinuing generation of the clock signal (GCLK). This may occur when the unreliable clock signal degrades or is missing.

Through the generation and non-generation of the clock signal (GCLK), the state machine 376 generates the gapped clock.

Exemplary Processing

FIGS. 7–10 are exemplary flowcharts of processing by the reliable clock generator 110 according to an implementation consistent with the present invention. Processing begins when the write logic 220 (FIG. 3) receives data and possibly an unreliable clock signal from a transmission medium, such as a network. Once this occurs, one of at least four possible paths may be taken depending on the state of the unreliable clock signal. The unreliable clock signal may be in one of at least four different states: STATE 1—the unreliable clock signal may exist and operate at the correct frequency; STATE 2—the unreliable clock signal may exist and operate at a frequency lower than the correct frequency; STATE 3—the unreliable clock signal may exist and operate at a frequency higher than the correct frequency; and STATE 4—the unreliable clock signal may be missing. Assume for this example that the "correct" frequency is 77 MHz.

STATE 1

Figure 7:
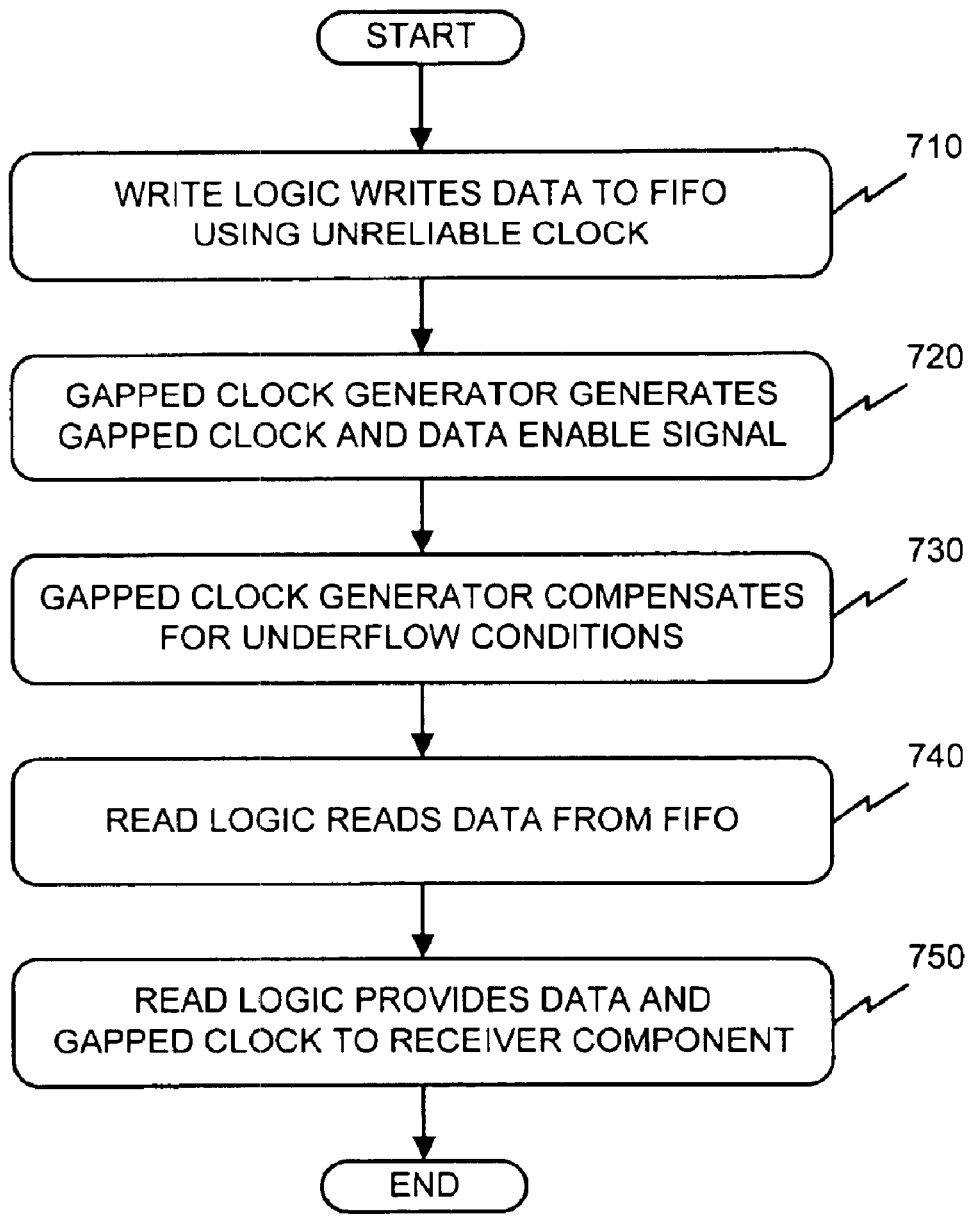
FIGS. 7–10 are exemplary flowcharts of processing by the reliable clock generator of FIG. 1 according to an implementation consistent with the present invention.

When the unreliable clock signal exists and operates at the correct frequency, the processing of FIG. 7 may occur. The write logic 220 may write the received data to the FIFO 320 [step 710]. The write logic 220 may use the unreliable clock signal to write the data to the FIFO 320 at an address determined by the write pointer 344.

The read pointer 380 generates an address for reading the data from the FIFO 320. The comparator 372 compares the read address with the write address generated by the write pointer 344. When the comparison indicates that data exists in the FIFO 320, the comparator 372 generates signal GT0. As described above, the gapped clock generator 374 uses the signal GT0 and a constant clock signal of, for example, 157 MHz to generate the gapped clock (GCLK) and the data enable signal (DATA_EN) (i.e., enters second state 520 in FIG. 5) [step 720].

The gapped clock generator 374 may generate a clock that toggles every 157 MHz clock cycle, resulting in a 78.5 MHz clock. Using a read clock (i.e., the 78.5 MHz gapped clock signal) that is slightly faster than the write clock (i.e., the 77 MHz unreliable clock signal) guarantees that all of the data in the FIFO 320 is read out. A slightly higher read rate, however, implies that the FIFO 320 drain rate is higher than the fill rate and may result in a FIFO underflow condition. The gapped clock generator 374 compensates for underflow periods by putting gaps in the generated clock (GCLK) (i.e., switches between second state 520 and third state 530 in FIG. 5) [step 730]. The gapped clock generator 374, through use of the data enable signal (DATA_EN), also prevents data from being read out of the FIFO 320 until new data exists in the FIFO 320.

Using the constant clock signal (CNSTCLK) and the data enable signal (DATA_EN), the register 362 reads data from the FIFO 320 [step 740]. The combination of the constant clock signal (CNSTCLK) and the data enable signal (DATA_EN) creates the read clock signal used by the register 362 to access the FIFO 320. The read logic 230 may provide the data from the FIFO 320 and the gapped clock (GCLK) to the receiver component 120 [step 750].

STATE 2

Figure 8:
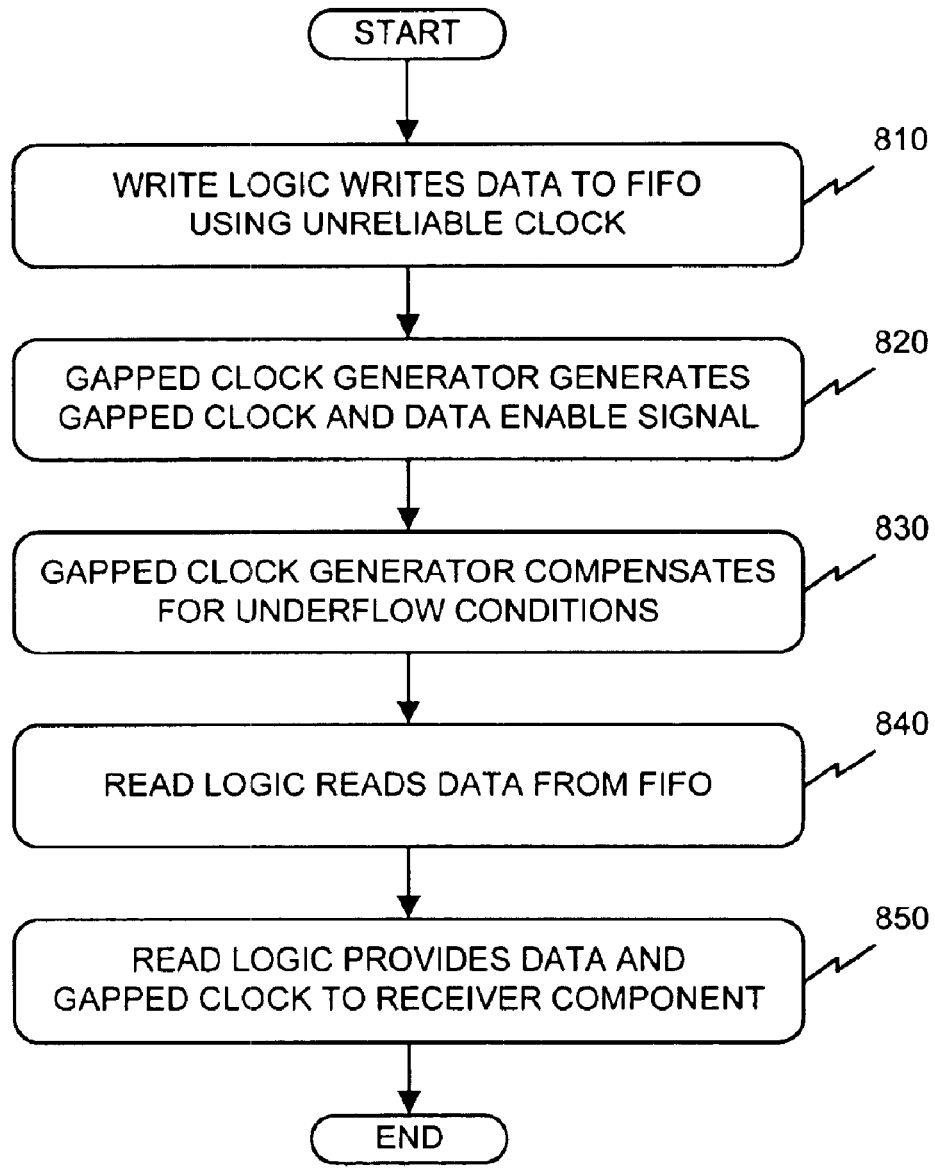

When the unreliable clock signal exists and operates at a frequency lower than the correct frequency, the processing of FIG. 8 may occur. The write logic 220 may write the received data to the FIFO 320 [step 810]. The write logic 220 may use the unreliable clock signal to write the data to the FIFO 320 at an address determined by the write pointer 344. Because the frequency of the unreliable clock signal is lower than the correct frequency, the write logic 220 writes the data to the FIFO 320 at a slower rate than in STATE 1.

The read pointer 380 generates an address for reading the data from the FIFO 320. The comparator 372 compares the read address with the write address generated by the write pointer 344. When the comparison indicates that data exists in the FIFO 320, the comparator 372 generates signal GT0. As described above, the gapped clock generator 374 uses the signal GT0 and a constant clock signal of, for example, 157 MHz to generate the gapped clock (GCLK) and the data enable signal (DATA_EN) (i.e., enters second state 520 in FIG. 5) [step 820].

The gapped clock generator 374 may generate a clock that toggles every 157 MHz clock cycle, resulting in a 78.5 MHz clock. In this case, the read clock (i.e., the 78.5 MHz gapped clock signal) is possibly much faster than the write clock (i.e., slower than the 77 MHz unreliable clock signal). The higher read rate implies that the FIFO 320 drain rate is higher than the fill rate and may result in more frequent FIFO underflow conditions. The gapped clock generator 374 compensates for underflow periods by putting longer gaps in the generated clock (GCLK) (i.e., remaining in third state 530 in FIG. 5 longer) [step 830]. The gapped clock generator 374, through use of the data enable signal (DATA_EN), also prevents data from being read out of the FIFO 320 until new data exists in the FIFO 320.

Using the constant clock signal (CNSTCLK) and the data enable signal (DATA_EN), the register 362 reads data from the FIFO 320 [step 840]. The read logic 230 may provide the data from the FIFO 320 and the gapped clock (GCLK) to the receiver component 120 [step 850].

STATE 3

Figure 9:
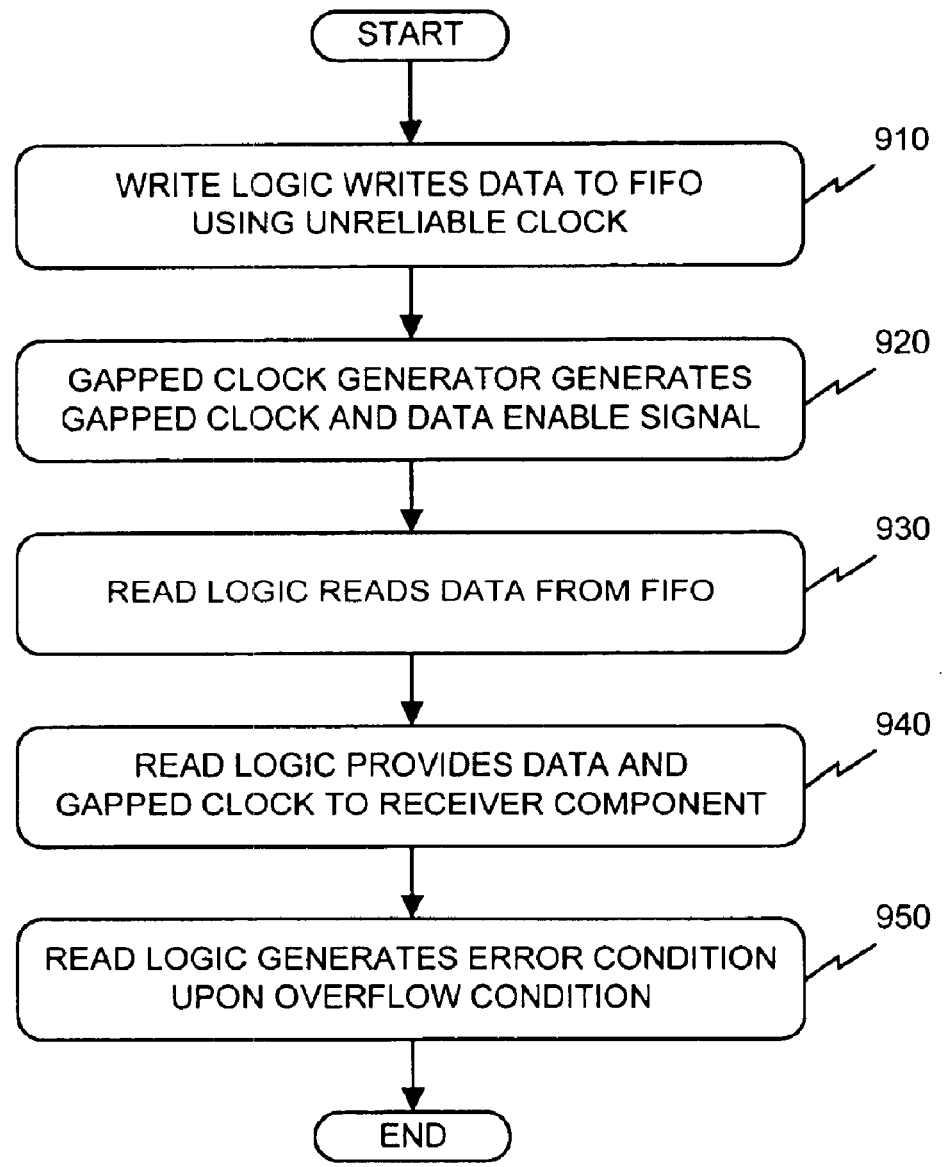

When the unreliable clock signal exists and operates at a frequency higher than the correct frequency, the processing of FIG. 9 may occur. The write logic 220 may write the received data to the FIFO 320 [step 910]. The write logic 220 may use the unreliable clock signal to write the data to the FIFO 320 at an address determined by the write pointer 344. Because the frequency of the unreliable clock signal is higher than the correct frequency, the write logic 220 writes the data to the FIFO 320 at a faster rate than in STATE 1.

The read pointer 380 generates an address for reading the data from the FIFO 320. The comparator 372 compares the read address with the write address generated by the write pointer 344. When the comparison indicates that data exists in the FIFO 320, the comparator 372 generates signal GT0. As described above, the gapped clock generator 374 uses the signal GT0 and a constant clock signal of, for example, 157 MHz to generate the gapped clock (GCLK) and the data enable signal (DATA_EN) (i.e., enters second state 520 in FIG. 5) [step 920].

The gapped clock generator 374 may generate a clock that toggles every 157 MHz clock cycle, resulting in a 78.5 MHz clock. In this case, the read clock (i.e., the 78.5 MHz gapped clock signal) is possibly slower than the write clock (i.e., faster than the 77 MHz unreliable clock signal). The higher write rate implies that the FIFO 320 fill rate is higher than the drain rate and may result in a FIFO overflow condition. A FIFO overflow condition may cause the FIFO 320 to receive more data than it is capable of storing.

Using the constant clock signal (CNSTCLK) and the data enable signal (DATA_EN), the register 362 reads data from the FIFO 320 [step 930]. The read logic 230 may provide the data from the FIFO 320 and the gapped clock (GCLK) to the receiver component 120 [step 940]. If an overflow condition occurs, the reliable clock generator 110 may generate an error signal [step 950].

STATE 4

Figure 10:
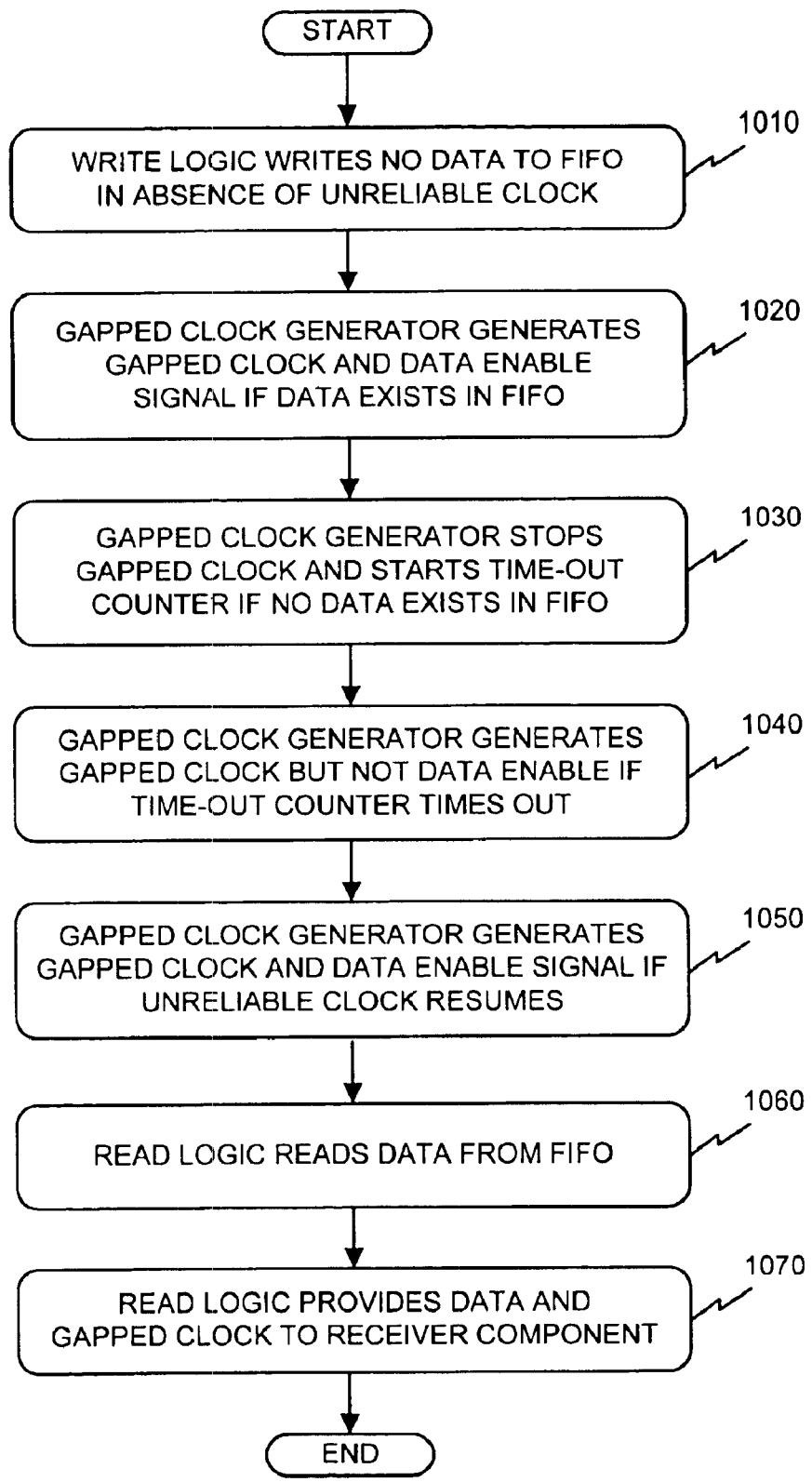

When the unreliable clock signal is missing, the processing of FIG. 10 may occur. Because there is no unreliable clock signal, the write logic 220 does not write any received data to the FIFO 320 [step 1010].

The read pointer 380 generates an address for reading data from the FIFO 320. The comparator 372 compares the read address with the write address generated by the write pointer 344. When the comparison indicates that data still exists in the FIFO 320, the comparator 372 generates signal GT0. As described above, the gapped clock generator 374 uses the signal GT0 and a constant clock signal of, for example, 157 MHz to generate the gapped clock (GCLK) and the data enable signal (DATA_EN) (i.e., enters second state 520 in FIG. 5) [step 1020].

In this case, the gapped clock generator 374 may generate a clock that toggles every 157 MHz clock cycle, resulting in a 78.5 MHz clock. Because the write clock does not exist, an underflow condition results. The gapped clock generator 374 stops generating the clock signal (GCLK) and starts a time-out counter (i.e., enters third state 530 in FIG. 5) [step 1030]. If the time-out counter times out (TO) before the write logic 220 begins receiving the unreliable clock signal again, the gapped clock generator 374 begins generating the clock signal (GCLK), but not the data enable signal (!DATA_EN) and waits for the unreliable clock signal to resume (i.e., enters first state 510 in FIG. 5) [step 1040]. If the unreliable clock signal resumes before the time-out counter times out (!TO), the gapped clock generator 374 begins generating the clock signal (GCLK) and the data enable signal (DATA_EN) to permit data to be read out of the FIFO 320 again [step 1050].

Thereafter, using the constant clock signal (CNSTCLK) and the data enable signal (DATA_EN), the register 362 reads data from the FIFO 320 [step 1060]. The read logic 230 may provide the data from the FIFO 320 and the gapped clock (GCLK) to the receiver component 120 [step 1070].

CONCLUSION

Systems and methods consistent with the present invention provide a reliable clock signal to aid in the reception and recovery of data when an unreliable clock signal accompanies the data. The systems and methods convert from the unreliable clock domain of the unreliable clock signal to the fixed clock domain of the reliable clock signal.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a number of elements have been shown in FIG. 3, the functions of at least some of these elements may be implemented in software in other implementations consistent with the present invention.

Also, the unreliable clock signal has been described as a 77 MHz clock, the constant clock signal as a 157 MHz clock, and the gapped clock signal as a 78.5 MHz clock. In other implementations consistent with the present invention, the clock frequencies may be different.

The scope of the invention is defined by the claims and their equivalents.

What is claimed is:

1. A system for reliably receiving data, comprising:
   a memory;
   write logic configured to receive data and an unreliable clock signal and write the data to the memory using the unreliable clock signal; and
   read logic configured to generate a data enable signal and a gapped clock signal that is generated by turning on and off a constant local clock signal, the gapped clock signal being used to recover the data, the read logic comprising:

a read register to receive the data enable signal and the constant local clock signal and read the data from the memory based on the data enable signal and the constant local clock signal.

2. The system of claim 1, wherein the write logic includes:
a write register configured to buffer the data, and
a write pointer configured to generate an address for writing the data from the write register into the memory.

3. The system of claim 1, wherein the memory includes a first-in, first-out memory.

4. The system claim 1, wherein the read logic includes:
a gapped clock generator configured to generate the gapped clock signal from the constant local clock signal.

5. The system claim 4, wherein the gapped clock generator includes:
a first state machine configured to generate an enable signal having at least two states and the data enable signal, and
a second state machine configured to turn on and off the constant local clock signal based on the state of the enable signal to generate the gapped clock signal.

6. The system of claim 5, wherein the read logic further includes:
a component configured to determine whether the memory contains data.

7. The system of claim 6, wherein the component includes:
a comparator configured to determine whether the memory contains data by comparing a write address used by the write logic to access the memory to a read address used by the read logic to access the memory.

8. The system of claim 6, wherein the second state machine is configured to turn off the constant local clock signal when the memory contains no data.

9. The system of claim 1, wherein the unreliable clock signal operates at a frequency lower than a frequency of the constant local clock signal; and
wherein the read logic is configured to compensate for underflow conditions in the memory by turning off the constant local clock signal and disabling the data enable signal.

10. The system of claim 1, wherein the unreliable clock signal operates at a frequency higher than a frequency of the constant local clock signal; and
wherein the read logic is configured to generate an error signal when overflow conditions occur in the memory.

11. The system of claim 1, wherein the write logic receives no unreliable clock signal; and
wherein the read logic is configured to start a counter and turn off the constant local clock signal.

12. The system of claim 11, wherein the read logic is further configured to determine that the write logic has received the unreliable clock signal before the counter reaches a predetermined count and turn on the constant local clock signal.

13. The system of claim 11, wherein the read logic is further configured to determine that the counter has reached a predetermined count and turn on the constant local clock signal and disable the data enable signal.

14. The system of claim 13, wherein the read logic is further configured to wait for the write logic to receive the unreliable clock signal before enabling the data enable signal and reading data from the memory.

15. A system for reliably receiving data, comprising:
means for receiving data and an unreliable clock signal;
means for writing the data to a memory using the unreliable clock signal;
means for generating a reliable clock signal by turning on and off a local clock signal;
means for generating a data enable signal;
means for reading the data from the memory using the data enable signal and the local clock signal and without using the reliable clock signal; and
means for recovering the data based on the reliable clock signal.

16. A method for recovering data, comprising:
receiving data and an unreliable clock signal;
writing the data to a memory using the unreliable clock signal;
providing a first state machine to generate a first enable signal and a second enable signal;
providing a second state machine to generate a gapped clock signal by turning on and off a constant local clock signal based on the second enable signal; and
reading the data from the memory using the first enable signal and the constant local clock signal.

17. The method of claim 16, wherein the writing includes:
generating an address for writing the data into the memory.

18. The method of claim 16, further comprising:
determining whether the memory contains data.

19. The method of claim 18, wherein the determining whether the memory contains data includes:
comparing a write address used to access the memory to a read address used to access the memory to determine whether the memory contains data.

20. The method of claim 18, wherein turning on and off the constant local clock signal includes:
stopping the constant local clock signal when the memory contains no data.

21. The method of claim 16, wherein the unreliable clock signal operates at a frequency lower than a frequency of the constant local clock signal; and
wherein the first and second state machines compensate for underflow conditions in the memory by turning off the constant local clock signal and disabling the first enable signal.

22. The method of claim 16, wherein the unreliable clock signal operates at a frequency higher than a frequency of the constant local clock signal; and
wherein the second state machine generates an error signal when an overflow condition occurs in the memory.

23. The method of claim 16, further comprising:
receiving no unreliable clock signal; and
wherein the second state machine starts a counter when no unreliable clock signal is received, and turns off the constant local clock signal when no unreliable clock signal is received.

24. The method of claim 23, wherein the second state machine determines that the unreliable clock signal has been received, and turns on the constant local clock signal when the unreliable clock signal has been received before the counter reaches a predetermined count.

25. The method of claim 23, wherein the second state machine determines that the counter has reached a predetermined count, and turns on the constant local clock signal.

26. The method of claim 25, wherein the reading the data from the memory includes:
waiting for the unreliable clock signal to be received before reading data from the memory.

27. A receiver, comprising:
a reliable clock generator configured to:
receive data and an unreliable clock signal,
write the data to a memory using the unreliable clock signal,
generate a reliable clock signal from a constant clock signal,
generate a first enable signal,
read the data from the memory using the first enable signal and the constant clock signal, and
output the data and the reliable clock signal; and
a receiver component configured to receive the data and the reliable clock signal from the reliable clock generator and recover the data based on the reliable clock signal;
where the reliable clock generator includes:
a first state machine configured to generate the first enable signal and a second enable signal, and
a second state machine configured to generate the reliable clock signal in response to the second enable signal.

28. The receiver of claim 27, wherein the reliable clock generator further includes:
a register configured to receive the data read from the memory in response to the first enable signal.

29. The receiver of claim 28, wherein the reliable clock generator further includes:
a component configured to determine whether the memory contains data.

30. The receiver of claim 29, wherein the first state machine is configured to generate the first and second enable signals when the memory contains data.

31. The receiver of claim 29, wherein first state machine is configured to generate neither of the first and second enable signals when the memory contains no data.

32. The receiver of claim 31, wherein the first state machine is further configured to start a counter when the memory contains no data.

33. The receiver of claim 32, wherein the first state machine is further configured to generate the first and second enable signals when the memory contains data before the counter reaches a predetermined count.

34. The receiver of claim 32, wherein the first state machine is configured to determine whether the counter has reached a predetermined count and generate the second enable signal when the counter reaches the predetermined count.

35. The receiver of claim 28, wherein the second state machine is configured to toggle the constant clock signal based on the second enable signal to generate the reliable clock signal.

36. A clock generator, comprising:
a first state machine configured to enter a plurality of states based, at least in part, on whether a memory stores data, within certain ones of the states, the first state machine is configured to generate first and second enable signals, the first enable signal being used to read data from the memory that was written to the memory using an unreliable clock signal; and
a second state machine configured to enter a plurality of states based, at least in part, on the second enable signal, within one of the states, the second state machine is configured to generate a gapped clock signal for reliably recovering the data, within another one of the states, the second machine is configured to generate no gapped clock signal.

37. The clock generator of claim 36, wherein the first state machine is further configured to determine whether the memory contains data.

38. The clock generator of claim 37, wherein the first state machine is configured to generate the first and second enable signals when the memory contains data.

39. The clock generator of claim 37, wherein the first state machine is configured to generate neither of the first and second enable signals when the memory contains no data.

40. The clock generator of claim 39, wherein the first state machine is further configured to start a counter when the memory contains no data.

41. The clock generator of claim 40, wherein the first state machine is further configured to generate the first and second enable signals when the memory contains data before the counter reaches a predetermined count.

42. The clock generator of claim 40, wherein the first state machine is configured to determine whether the counter has reached a predetermined count and generate the second enable signal when the counter reaches the predetermined count.

43. The clock generator of claim 36, wherein the second state machine is configured to toggle a constant local clock signal based on the second enable signal to generate the gapped clock signal.

44. A system, comprising:
a memory;
write logic configured to receive data and an unreliable clock signal and write the data to the memory using the unreliable clock signal; and
read logic including:
a first state machine configured to enter a plurality of states based, at least in part, on whether the memory stores data, within certain ones of the states, the first state machine is configured to generate first and second enable signals, the first enable signal being used to read data from the memory, and
a second state machine configured to enter a plurality of states based, at least in part, on the second enable signal, within one of the states, the second state machine is configured to generate a gapped clock signal for reliably recovering the data, within another one of the states, the second machine is configured to generate no gapped clock signal.

* * * * *